Nov. 4, 1930.          I. I. GREEN          1,780,384
FILTER HOLDER FOR CAMERAS
Filed Oct. 4, 1928
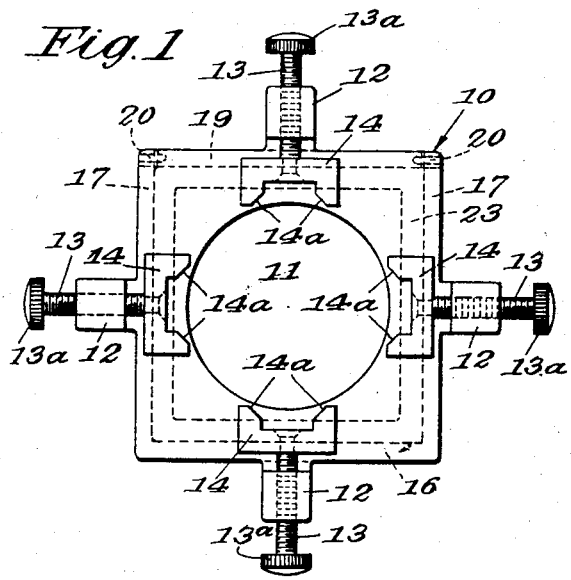
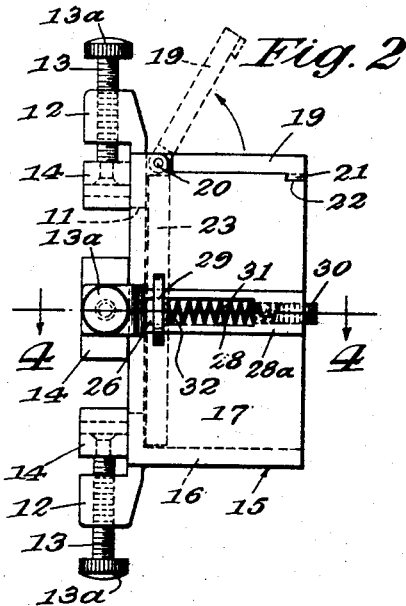
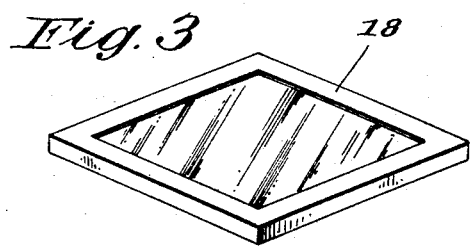
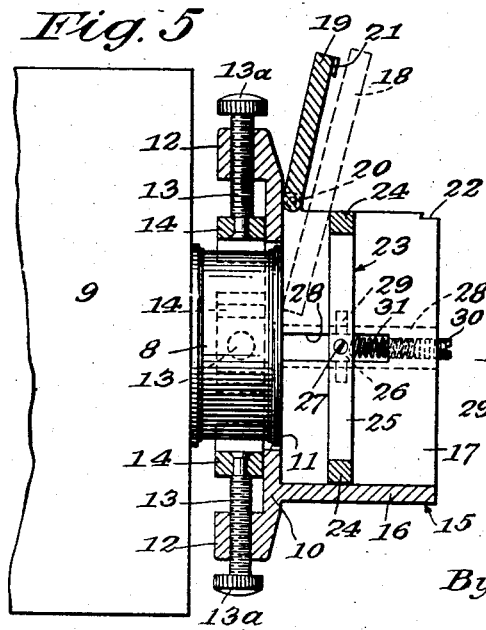
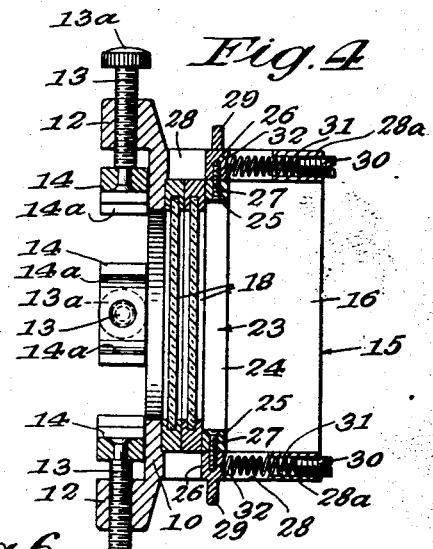
Inventor:
Irving I. Green
By Macleod, Calver, Copeland & Dike
Attorneys.

Patented Nov. 4, 1930

1,780,384

UNITED STATES PATENT OFFICE

IRVING I. GREEN, OF BROOKLINE, MASSACHUSETTS

FILTER HOLDER FOR CAMERAS

Application filed October 4, 1928. Serial No. 310,311.

This invention relates to a device or attachment, especially adapted for use on motion picture cameras, which may be readily and conveniently attached to the lens support of the camera and is particularly adapted for holding filters or screens employed in motion picture photography for obtaining special effects, such for example as fog, color, fade in and fade out effects.

An object of the invention is to provide an attachment of the foregoing type, herein termed for convenience a filter holder, having improved means for adjusting it firmly in position on the projecting lens support or the like of the camera, and wherein the device is so constructed that not only one but several filters or screens may be easily slipped into position and retained in front of the lens, so that combination effects may be obtained when desired.

The invention furthermore provides a filter holder which cannot be accidentally dislodged from the lens during usage, and which can at all times be retained on the camera without interfering with ordinary photographic work when no filter is being used.

Other objects of this invention will appear in the following description and appended claims, reference being had to the accompanying drawings forming a part of this specification.

Fig. 1 is a rear end elevation illustrating the device or attachment.

Fig. 2 is a side elevation thereof.

Fig. 3 is a perspective view of a conventional type of filter or screen.

Fig. 4 is a transverse section taken on line 4—4, Fig. 2, in the direction of the arrows.

Fig. 5 is a sectional view of the device illustrating the manner of mounting the same on the lens holder of the camera.

Fig. 6 is a detail view showing the guide parts for the filter clamp.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Referring to the drawings, wherein I have shown by way of illustration one embodiment of the invention, the filter holder or attachment may comprise a frame 10, in the present instance rectangular in shape, having a central circular aperture 11 preferably of sufficient diameter to fit over the usual circular lens holder 8 of a camera 9, as shown in Fig. 5. The frame 10 is provided with a series of outwardly and rearwardly extending bosses or lugs 12 in position to overlie the lens holder 8. In the present instance four of these bosses are shown, one at each side of the frame member 10. Each boss 12 is tapped to receive an adjusting screw 13 having a knurled head 13$^a$, and each carrying at its inner end a jaw 14 preferably having an articulated connection with the end of the adjusting screw. Each jaw is provided with oppositely tapered faces 14$^a$ adapted to engage the lens holder. From the foregoing construction it will be seen that the several jaws 14 may be adjusted radially toward and from the lens holder, so that the device may be easily attached to the camera and firmly clamped in position against any danger of dislodgment by accidentally striking it.

The frame 10 preferably comprises a forwardly extending casing or hood 15, which in the present instance is rectangular in cross section. The casing or housing 15 comprises bottom and side walls 16 and 17 respectively forming a housing within which may be supported one or more filters 18. The top of the casing or housing 15 is open to permit the filters 18 to be inserted within the casing, as shown in dotted lines in Fig. 5. This opening at the top of the casing is preferably closed by means of a closure 19 which is hinged at its rear edge 20 to the housing and which when swung down into closed position may be releasably latched by means of suitable catches 21 cooperating with notches 22 in the upper edges of the side walls 17.

In the present instance the filter or screen frames 18 are clamped in position within the casing 15 by means of a clamping frame 23 adapted to slide within the casing against the action of compression springs. Accordingly, the clamping member 23 is shown as comprising a rectangular skeleton frame adapted to fit within the correspondingly shaped interior of the casing 15. The frame has a central opening of a size preferably somewhat greater than the lens opening in the camera. This clamping member 23 comprises top and bottom frame members 24 connected together by upright side members 25. The clamping frame is supported and guided within the casing by means of laterally projecting guide members 26 at opposite sides thereof. As shown in Figs. 4 and 6 the guide members 26 each comprises a square block detachably secured to the frame member 25 by means of a screw 27. Each guide block 26 rides within a horizontal square slot 28 formed in a boss 28ª which is integral with the side wall 17 of the casing. Each guide slot 28 is positioned at the up and down centre of each of the upright side walls 17 of the casing. The guide blocks 26 each terminate in a finger piece 29. Each wall 17 in front of and in line with the slot 28 is drilled and tapped to receive a set screw 30 and to provide a socket or seat for a compression spring 31 interposed between the adjusting screw 30 and a seat 32 on the outer face of the guide block 26.

From the foregoing construction it will readily be seen that the clamping frame 23 may be manually shifted forwardly against the action of the springs 31 by grasping the wings 29 with the fingers of one hand, thereby permitting the operator to insert one or more filters 18 through the top of the casing into position in rear of the clamp, after which the latter is released and the action of the springs will cause the filter frame to be firmly held in position against the back of the casing. The pressure of the springs 31 may be varied by means of the adjusting screws 30. It will also be seen from the foregoing that the attachment may be firmly clamped in position upon the lens holder of the camera, without any danger of displacement or dislodgment therefrom.

A number of filters providing combination effects may be slipped into position in the casing in front of the camera lens in the manner above described, simply by grasping the wings 29 of the clamping frame and sliding it outwardly, after which the filters are slipped through the top opening in the casing. The closure 19 may then be lowered in position, providing a suitable canopy for shutting out light from the lens.

What I claim is:

1. A device of the class described comprising a housing adapted to receive one or more filters and having an opening at one side for the insertion thereof into the housing, means for attaching the housing to a camera lens, and a spring actuated slide member movable toward and from the lens for clamping one or more filters in position in front of the lens.

2. A device of the class described comprising a housing adapted to receive one or more filters and having an opening at one side for the insertion thereof into the housing, a series of radially adjustable jaws for attaching the housing to the camera lens, and a spring actuated slide member movable toward and from the lens for clamping one or more filters in position in front of the lens.

3. A filter holder for cameras comprising a frame adapted to fit over the lens housing, radially extending jaws for clamping the frame in position, a forwardly extending casing adapted to support a plurality of filter frames, and a spring controlled member movable toward the lens for clamping the filter frames in position within the casing.

4. A device of the class described comprising a frame having a central opening to fit over the lens support of a camera, radially adjustable means for attaching the frame to the lens support, a filter holder supported by said frame, and a spring device carried thereby and movable outwardly from the lens to release the filter and inwardly to clamp it.

5. A device of the class described comprising a housing to receive one or a plurality of filter frames, means for attaching the housing to a camera lens, a movable clamping frame engageable at the edges only of a filter frame, and spring means for forcing said clamping frame toward the camera lens to clamp the filter frame in position.

6. A device of the class described comprising a housing to receive one or a plurality of filter frames, means for attaching the housing to a camera lens, a slide frame movable axially of the lens to engage the forward edges of the filter frames, and cooperating guides carried by the housing and slide frame for guiding the latter in a predeterminel path within the housing.

In testimony whereof I affix my signature.

IRVING I. GREEN.